(12) United States Patent
Shimizu (10) Patent No.: US 11,273,830 B2
(45) Date of Patent: Mar. 15, 2022

(54) VEHICLE CONTROL DEVICE

(71) Applicant: Hitachi Automotive Systems, Ltd., Hitachinaka (JP)

(72) Inventor: Ryosuke Shimizu, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 235 days.

(21) Appl. No.: 16/614,526

(22) PCT Filed: Mar. 28, 2018

(86) PCT No.: PCT/JP2018/012664
§ 371 (c)(1),
(2) Date: Nov. 18, 2019

(87) PCT Pub. No.: WO2018/230095
PCT Pub. Date: Dec. 20, 2018

(65) Prior Publication Data
US 2020/0172101 A1    Jun. 4, 2020

(30) Foreign Application Priority Data

Jun. 15, 2017 (JP) .............................. JP2017-117338

(51) Int. Cl.
*B60W 30/16* (2020.01)
*B60W 30/02* (2012.01)
(Continued)

(52) U.S. Cl.
CPC .......... *B60W 30/16* (2013.01); *B60W 30/025* (2013.01); *B60W 30/08* (2013.01);
(Continued)

(58) Field of Classification Search
CPC .... B60W 30/16; B60W 30/025; B60W 30/08; G05D 1/0223; G05D 2201/0213; G06K 9/00791; H04L 12/40; H04L 2012/40273
See application file for complete search history.

(56) References Cited

U.S. PATENT DOCUMENTS 6,269,308 B1 * 7/2001 Kodaka ................ G01S 13/931
701/301
7,218,758 B2 * 5/2007 Ishii .......................... B60R 1/00
340/933

(Continued)

FOREIGN PATENT DOCUMENTS

EP      3 070 675 A1    9/2016
JP      2001-195700 A    7/2001

(Continued)

OTHER PUBLICATIONS

International Search Report with English translation and Written Opinion issued in corresponding application No. PCT/JP2018/012664 dated Jun. 12, 2018.

(Continued)

*Primary Examiner* — Calvin Cheung
(74) *Attorney, Agent, or Firm* — Foley & Lardner LLP (57) ABSTRACT

An object of the vehicle control device according to the present invention is to provide a driver with acceleration/deceleration control of a vehicle with less discomfort even in a situation where correction of measurement of an inter-vehicle distance is required due to a temperature change or the like. The present invention is a vehicle control device 100 configured to perform acceleration/deceleration control of a vehicle according to a relative speed and an inter-vehicle distance with respect to a preceding vehicle obtained from a parallax image, in which the acceleration/deceleration control of the vehicle is performed with the inter-vehicle distance being less than a certain value, the vehicle control
(Continued)

device 100 includes correction means 230 for, in a case where the parallax image is not acquired in a correct state due to distortion due to a temperature change or an incorrect mounting position, correcting the distortion or the incorrect mounting position by the acquired parallax image, and a start timing of the acceleration/deceleration control of the vehicle is changed during a correction operation by the correction means 230.

5 Claims, 9 Drawing Sheets

(51) Int. Cl.
  *B60W 30/08* (2012.01)
  *G05D 1/02* (2020.01)
  *G06K 9/00* (2022.01)
  *H04L 12/40* (2006.01)

(52) U.S. Cl.
  CPC ....... *G05D 1/0223* (2013.01); *G06K 9/00791* (2013.01); *H04L 12/40* (2013.01); *G05D 2201/0213* (2013.01); *H04L 2012/40273* (2013.01)

(56) References Cited

U.S. PATENT DOCUMENTS

| | | | |
|---|---|---|---|
| 2009/0164109 A1 | 6/2009 | Maruyama | |
| 2010/0182484 A1* | 7/2010 | Iijima | H01L 27/14627 348/340 |
| 2012/0242799 A1* | 9/2012 | Saito | G06K 9/00791 348/46 |
| 2013/0088578 A1 | 4/2013 | Umezawa et al. | |
| 2015/0015384 A1 | 1/2015 | Shima et al. | |
| 2015/0165972 A1* | 6/2015 | Takemae | G06T 7/593 348/148 |
| 2015/0279017 A1* | 10/2015 | Tamura | G06K 9/00798 382/103 |
| 2016/0114812 A1 | 4/2016 | Maruyama | |
| 2016/0227188 A1* | 8/2016 | Aoki | G06K 9/52 |
| 2016/0275694 A1 | 9/2016 | Nomura | |
| 2017/0327114 A1 | 11/2017 | Saito | |
| 2019/0019044 A1* | 1/2019 | Motohashi | G06T 7/00 |

FOREIGN PATENT DOCUMENTS

| | | |
|---|---|---|
| JP | 2009-149254 A | 7/2009 |
| JP | 2016-083990 A | 5/2016 |
| JP | 2016-176919 A | 10/2016 |
| JP | 2017-202742 A | 11/2017 |

OTHER PUBLICATIONS

Extended European Search Report issued in corresponding European Patent Application No. 18818686.0 dated Feb. 15, 2021.

* cited by examiner

VEHICLE CONTROL DEVICE

TECHNICAL FIELD

The present invention relates to a vehicle control device.

BACKGROUND ART

In order to reduce a burden on a driver in a driving operation of a vehicle, a technique is known which measures an inter-vehicle distance to a preceding vehicle and a relative speed with respect to the preceding vehicle using a radar or a camera, and travels by following the preceding vehicle without operating the accelerator or brake (for example, refer to PTL 1).

In the control device of PTL 1, the inter-vehicle distance to the preceding vehicle is measured using stereo vision by a plurality of cameras.

In the method of correcting a detected distance error in PTL 2, the direction of a camera is estimated from a vanishing point of an image captured by each camera, and the detected distance error is corrected when the inter-vehicle distance is calculated from a parallax image.

CITATION LIST

Patent Literature

PTL 1: JP 2009-149254 A
PTL 2: JP 2016-176919 A

SUMMARY OF INVENTION

Technical Problem

However, in the related art, unless a reference image for estimating the direction of the camera is acquired for several tens of seconds to several minutes, it is difficult to calculate a correct correction amount of the detected distance error. If an inter-vehicle distance control is performed in a state where the correct correction amount of the detected distance error is not calculated, the relative speed becomes larger than an original value and the vehicle decelerates suddenly, and thus the control may be forcibly released. However, during that time, the driver has to perform the following travel by himself/herself, which is inconvenient and thus is not desirable.

On the other hand, even in a case where the correct correction amount of the detected distance error is not calculated, if the detected distance error can be reduced with respect to the deviation of the direction of the camera, the control can be safely performed. Therefore, there are a method of moving the camera installation position away, and a method of using a material that is highly resistant to temperature changes and aging, for example. However, in a case where the camera installation position is moved away, there are restrictions on designability, a decrease in productivity due to the difficulty in adjusting a mounting position, fuel consumption deterioration due to an increase in weight, and an increased in material costs. In addition, even in a case where a material that is highly resistant to temperature changes and aging is used, when trying to achieve both strength and flame resistance that can withstand in-vehicle use, the material cost is increased, which is not desirable.

Therefore, although it is desirable that a camera that measures a distance to a preceding vehicle using stereo vision is small and lightweight and is made of an inexpensive material, if an inter-vehicle distance control is performed in a case where the detected distance error is large, there is a problem in that sudden deceleration occurs, the driver feels a sense of discomfort, and the control cannot be implemented.

Solution to Problem

In order to solve the problems, a vehicle control device according to the present invention is a vehicle control device configured to perform acceleration/deceleration control of a vehicle according to a relative speed and an inter-vehicle distance with respect to a preceding vehicle obtained from a parallax image, in which the acceleration/deceleration control of the vehicle is performed with the inter-vehicle distance being less than a certain value, the vehicle control device includes correction means for, in a case where the parallax image is not acquired in a correct state due to distortion due to a temperature change or an incorrect mounting position, correcting the distortion or the incorrect mounting position by the acquired parallax image, and a start timing of the acceleration/deceleration control of the vehicle is changed during a correction operation by the correction means.

Advantageous Effects of Invention

According to the vehicle control device of the present invention, it is possible to provide a driver with acceleration/deceleration control of a vehicle with less discomfort even in a situation where correction of measurement of an inter-vehicle distance is required due to a temperature change or the like.

DESCRIPTION OF EMBODIMENTS

Figure 1:
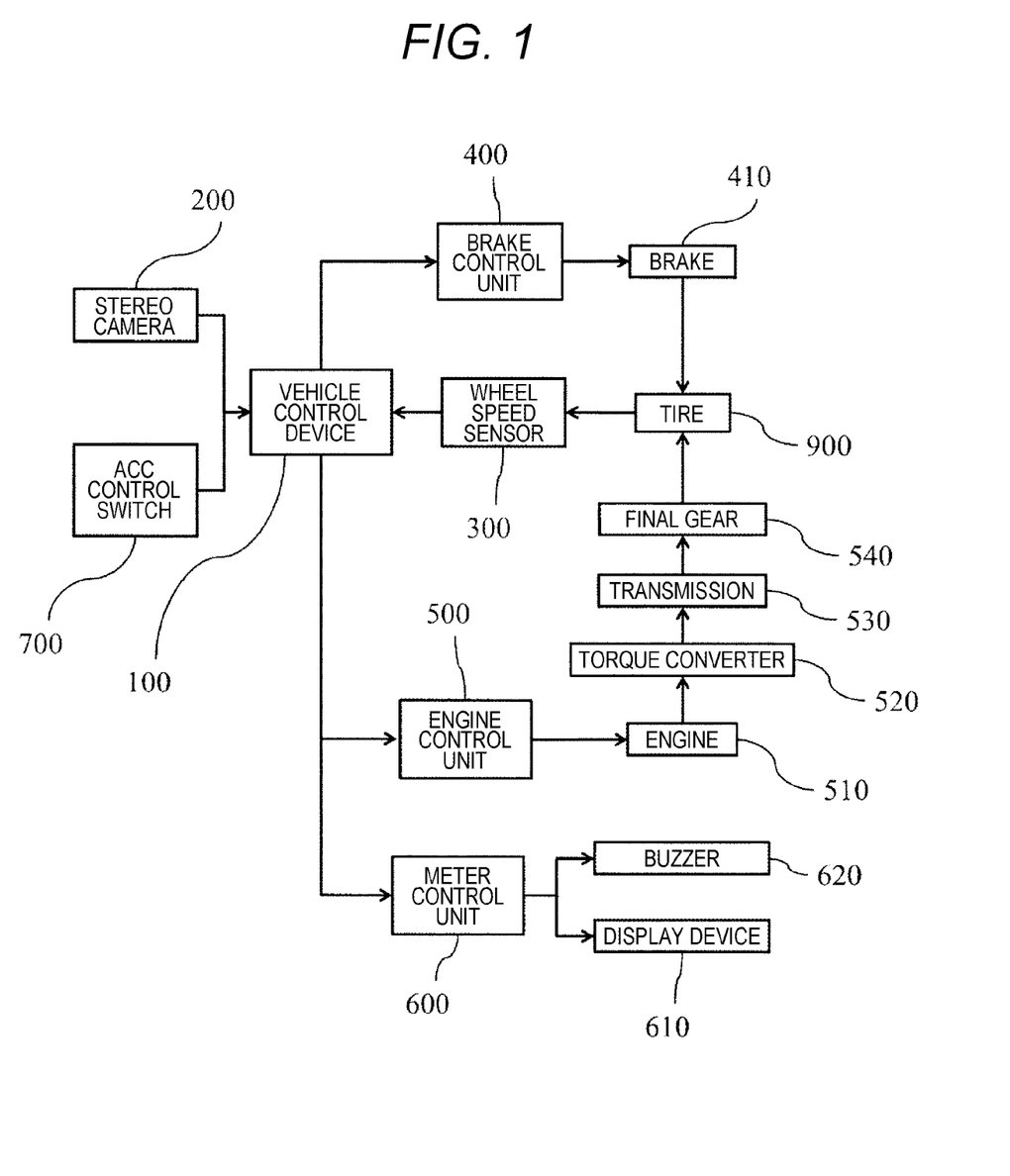
FIG. 1 is a configuration block diagram of a vehicle system of ACC.

Hereinafter, a vehicle control device according to an embodiment of the present invention will be described with reference to the drawings. The vehicle control device is mounted on a vehicle and constructs the vehicle according to the block diagram as illustrated in FIG. 1.

A vehicle control device 100 is connected to a stereo camera 200, and an inter-vehicle distance measured by the stereo camera 200 is transmitted to the vehicle control device 100 by communication. In addition, a wheel speed sensor 300 attached to the vehicle wheel is connected to the vehicle control device 100, the number of revolutions of a tire 900 is measured by the wheel speed sensor 300, and the speed of the host vehicle is transmitted to the vehicle control device 100. An active cruise control (ACC) switch 700 is connected to the vehicle control device 100, and information of the driver's switch operation is transmitted to the vehicle control device 100 so that ACC control start, ACC control release, and a set speed at the time of ACC traveling by the driver are determined. With this configuration, the vehicle control device 100 calculates a control amount by obtaining the inter-vehicle distance, the host vehicle speed, and the set speed at the time of the ACC traveling.

Further, the vehicle control device 100 calculates a control amount by the brake and a control amount by the engine based on the calculated control amount, and determines a notification method for the driver.

The calculated control amount by the brake is transmitted by communication to a brake control unit 400 connected to the vehicle control device 100, and the brake control unit 400 operates a brake 410 which is an actuator to control deceleration of the vehicle by using a frictional force on the tire 900.

Further, the control amount by the engine is transmitted by communication to an engine control unit 500 connected to the vehicle control device 100, and the engine control unit 500 operates an engine 510. An acceleration force generated by the engine 510 is boosted through a torque converter 520, a transmission 530, and a final gear 540, and is transmitted to the tire 900 to control the acceleration of the vehicle.

Furthermore, the notification method for the driver determined by the vehicle control device 100 is transmitted by communication to a meter control unit 600 connected to the vehicle control device 100 so that the meter control unit 600 performs a warning using a buzzer 620, or performs a control state notification using a display device 610. In addition, the connection mentioned above is performed using car area network (CAN).

Figure 2:
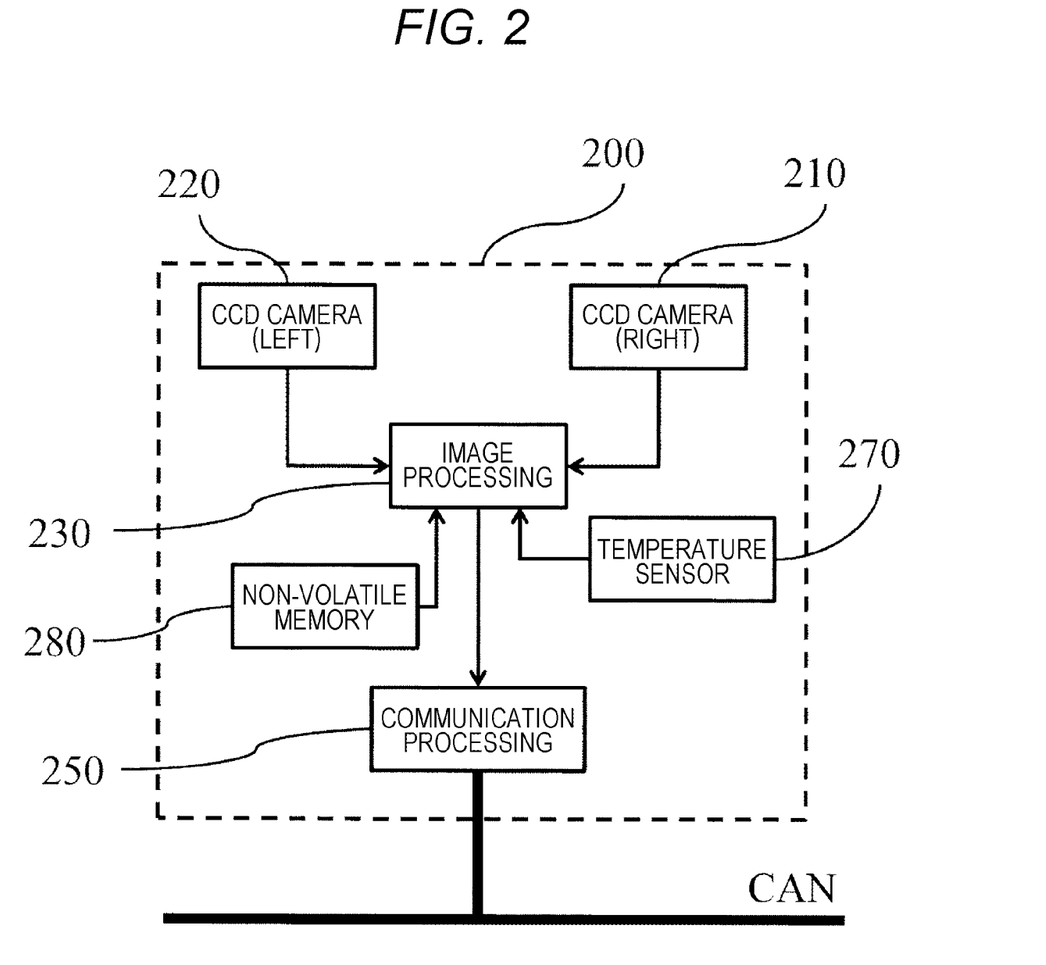
FIG. 2 is a configuration block diagram of a stereo camera.

Next, the details of what kind of function each block described in FIG. 1 has will be described. A configuration of the stereo camera 200 is illustrated in FIG. 2. The stereo camera 200 includes a charge-coupled device (CCD) camera (right) 210 and a CCD camera (left) 220 (CCD camera (right) 210 and CCD camera (left) 220 are collectively referred to as "imaging unit"), and measures an inter-vehicle distance by inputting images obtained by the CCD camera (right) 210 and the CCD camera (left) 220 to image processing 230. The inter-vehicle distance is transmitted to the vehicle control device 100 through communication processing 250 through a CAN bus of the vehicle. The inter-vehicle distance is measured by processing the images obtained from the left and right CCD cameras through the image processing 230, and the principle thereof will be described using FIG. 3.

Figure 3:
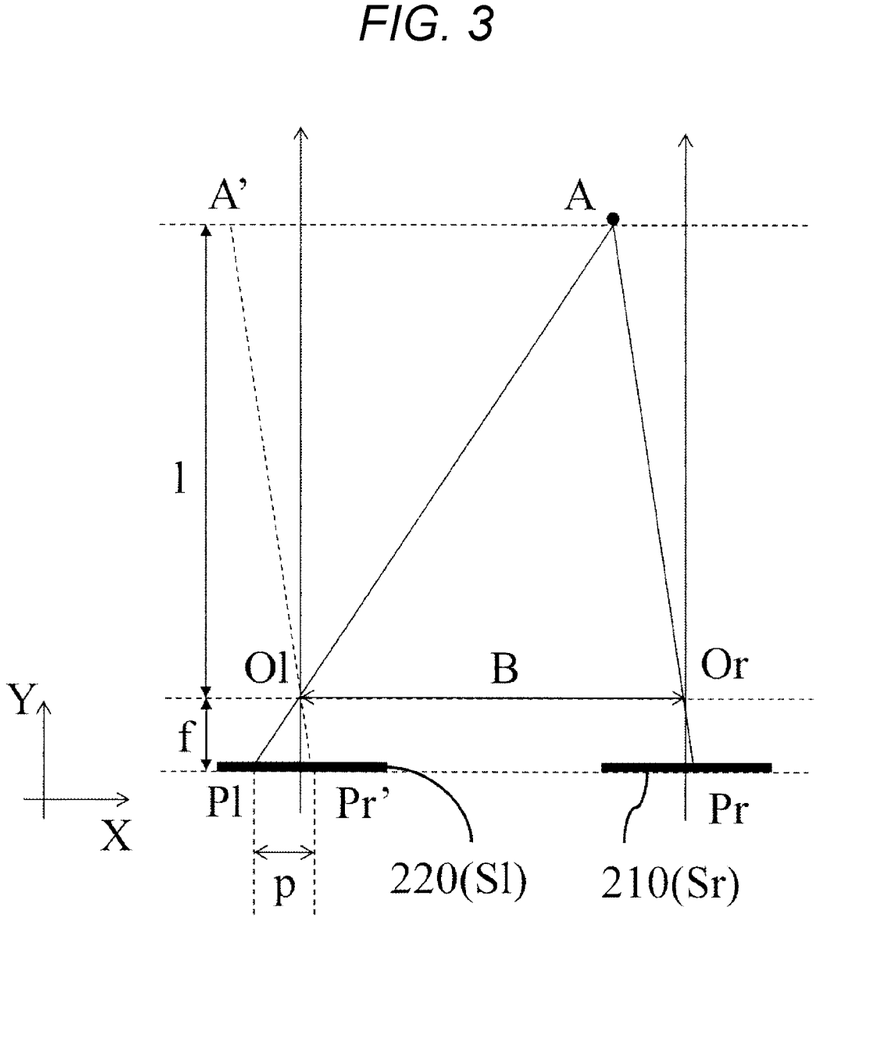
FIG. 3 is an explanatory diagram of an equation by stereo vision of a stereo camera.

FIG. 3 is a view illustrating a positional relationship between the CCD camera (right) 210, the CCD camera (left) 220, and a detection target A. The CCD camera (right) 210 and the CCD camera (left) 220 are mounted to be horizontal to the ground such that the imaging surfaces thereof face a forward direction of the vehicle. Then, a direction toward the side of the vehicle is defined as an X axis, and a direction which is orthogonal to the X axis and in which the detection target A is present, that is, the forward direction of the vehicle is defined as a Y axis. The detection target A is separated from the installation position of the camera by a distance l in the Y axis. Further, the focal length of the CCD camera (right) 210 and the CCD camera (left) 220 is set as f. Further, the imaging surface of the CCD camera (right) 210 is set as Sr, the focal position of the CCD camera (right) 210 is set as Or, and an intersection between a straight line A-Or and Sr is set as Pr. Similarly, the imaging surface of the CCD camera (left) 220 is set as Sl, the focal position of the CCD camera (left) 220 is set as Ol, and an intersection between a straight line A-Ol and Sl is set as Pl.

Further, the CCD camera (right) 210 and the CCD camera (left) 220 are disposed at positions separated by a base length B in the X-axis direction. Then, an intersection between Sl and a straight line A'-Ol which is obtained by moving the position of the straight line A-Or in parallel by the distance of the base length B is set as Pr', and a distance between Pl and Pr' in the X-axis direction is set as parallax p. The parallax p corresponds to an amount of deviation of imaging positions of the detection target A in the images captured by the CCD camera (right) 210 and the CCD camera (left) 220.

As illustrated in FIG. 3, a triangle A-Ol-Or and a triangle Ol-Pl-Pr' are similar. Accordingly, the distance l to the detection target A can be calculated by Equation 1 below.

$$l = B \times f \div p \qquad \text{(Equation 1)}$$

Therefore, the distance l to the detection target A using the stereo camera 200 can be calculated by clarifying the base length B, the focal length f, and the parallax p.

The base length B can be clarified by fixing installation positions of the CCD camera (right) 210 and the CCD camera (left) 220 on the hardware configuration. Similarly, the focal length f can also be clarified by fixing a curvature of the lens on the hardware configuration. Therefore, the detection target A is extracted from the images captured by the CCD camera (right) 210 and the CCD camera (left) 220, and the distance l is obtained by calculating the parallax B.

Figure 4:
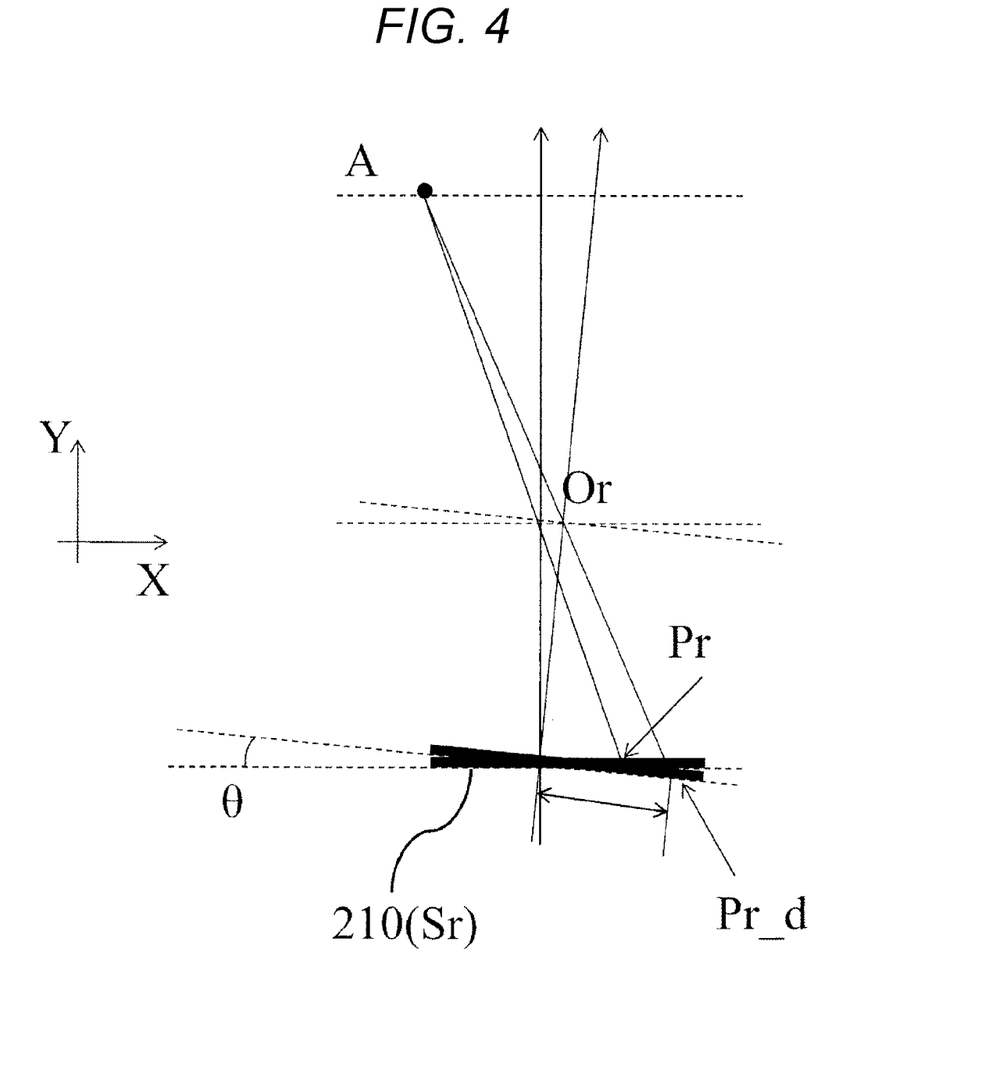
FIG. 4 is an explanatory view of a symbol of deviation by stereo vision of a stereo camera.

FIG. 4 illustrates the positional relationship between the CCD camera (right) 210 and the detection target A illustrated in FIG. 3 in a case where the direction of the CCD camera (right) 210 is changed due to thermal deformation of hardware or deformation due to aging. θ in FIG. 4 indicates a changed angle of the direction of the CCD camera (right) 210 on the X-Y plane. In this case, since the focal position is also changed according to the angle θ, and the position of Pr is moved to the outside of the camera, the position of A reflected on Sr becomes the outside to become Pr d outside an object facing the front. Therefore, when the direction of the CCD camera is changed, the parallax p cannot be obtained correctly and becomes p' including an error, which appears as an error in distance data in proportion to the base length and the focal length. Therefore, c has a mechanism for estimating the direction change θ and removing an error from the calculated distance 1.

The processing of estimating the change θ performed by the image processing 230 is obtained by estimating the vanishing point of the image from the shape of the roadway outer line detected during traveling and estimating the change θ from the error of the vanishing point. In addition, there are situations where the roadway outer line cannot be detected due to environmental influences such as dirt and snow cover on the road, and in some cases, it may be erroneously recognized as another object visible on the roadway outer line and corrected. Therefore, in the case of estimating the change θ, it is desirable to prevent the correction from being erroneously performed by sequentially calculating the change θ after a plurality of images are captured during traveling and the roadway outer line can be stably detected from the plurality of images.

Further, the estimated change θ is held in a non-volatile memory 280 even if the ignition is turned off, and the change θ is read out from the non-volatile memory 280 and is used when the ignition is turned on again to start traveling so that the distance can be measured correctly even when the roadway outer line is not visible with the camera.

Further, the causes of the change θ requiring the correction processing are classified into three, deformation due to impact, deformation due to aging, and deformation due to heat. Among them, deformation due to impact tends to make the absolute value of the change θ very large, such as when an object strongly strikes the stereo camera. Furthermore, it is preferable that it is described in a user manual or the like that if an action such as strongly hitting the stereo camera is performed, the stereo camera will break down, a failure is determined when the absolute value of the change θ is equal to or greater a certain value due to impact, a failure is notified to the driver by lighting or the like in order to replace the parts, and the control is released.

In addition, since deformation due to aging has a very small amount of change per hour of change θ, it is desirable to make it difficult to perform erroneous correction calculation because there is no hindrance even the calculation is performed over time such as tightening conditions for calculating the change θ using more images.

Then, regarding the deformation due to heat, the amount of deformation of the stereo camera is increased with respect to the time during which processing of estimating the change θ is performed, in a situation in which for example, after the stereo camera is deformed in a parked state under the sun without operating the air conditioner or the like, the temperature of the stereo camera is drastically lowered by operating the air conditioner by the driver who gets in and by the traveling wind with the start of traveling, and in a situation in which the value of the change θ is stored in the non-volatile memory 280 in a low temperature state at night, it becomes daytime under the sun in a situation where the correction amount cannot be calculated due to the turning off of the ignition, and the driver gets in to start traveling while the temperature is high. Therefore, the temperature inside the camera is measured using a temperature sensor 270, and in a case where a temperature difference is large, it is desirable to perform temperature calculation in a short time by reducing the number of images used for calculation of correction to ease the conditions for calculating the change θ. In particular, it is desirable that detection can be performed even in a case where the temperature is largely changed while the ignition is off, by also storing the temperature at the time of turning off the ignition in the non-volatile memory 280 in the same manner as the change θ. As described above, the fact that the correction in a case where the temperature difference is large is transmitted to the vehicle control device 100 through the CAN bus of the vehicle by the communication processing 250 in the same manner as the inter-vehicle distance. In addition, in a case where the correction of the change θ is not performed for a long time because the condition for permitting correction is not established for a long time such as a case where the roadway outer line is not visible, or the change θ is not correct, transmission to the vehicle control device 100 is performed through the CAN bus of the vehicle by the communication processing 250 to enable switching of the control method.

Next, the contents of an acceleration control performed by the vehicle control device 100 will be described using the flowchart of FIG. 5. The processing incorporated in the vehicle control device 100 performs the processing described in the flowchart of FIG. 5 at a regular cycle, receives the inter-vehicle distance, the set vehicle speed, and the host vehicle speed described above, and executes the processing described in the flowchart of FIG. 5 to perform the ACC control.

In describing the contents, symbols are defined as follows. A speed of the host vehicle is set as Vh. A speed of the preceding vehicle is set as Vp. A relative speed is set as Vdiff, and a positive value is a direction in which the host vehicle and the preceding vehicle become apart. A set vehicle speed is set as Vtgt. A distance to the preceding vehicle is set as l. A vehicle head time is set as Th. A distance to the preceding vehicle in a case where the vehicle is stopped following the preceding vehicle is set as Loffset. A target inter-vehicle distance is set as l_tgt. A target acceleration is set as TgtA. A target acceleration with respect to the preceding vehicle is set as TgtA_Pv. A target acceleration with respect to the set vehicle speed is set as TgtA_Spd. An acceleration request to the engine is set as AccelReq_Eg. An acceleration request to the brake is set as AccelReq_Brk. Acceleration generated by the engine brake is set as EgBrkAccel. The execution cycle of acceleration control processing is set as Tc.

The ACC control starts from processing 101 and executes from processing 105. In the processing 105, the relative speed Vdiff between the preceding vehicle and the host vehicle is calculated. Vdiff is obtained by time differentiation of l. Since the processing 105 is executed at a regular cycle, l is stored in the RAM or the like mounted on the vehicle control device 100, and the difference between l stored one cycle before and the current l is divided by a cycle Tc to obtain Vdiff.

Next, determination 110 is executed. In the ACC control permission determination of the determination 110, it is determined whether any of the following states is present and the ACC control cannot be performed.

ACC is disabled by the occurrence of a failure, unavailability of acquiring an image of a camera (bad weather or lens dirt), or the switch operation.

The brake is depressed.

The gear position is outside the drive range.

The vehicle is traveling at a speed that cannot be controlled.

The parking brake is operated.

The steering angle is equal to or greater than a certain level.

In a case where the vehicle is in any of the above states, it is determined that performing the ACC control is inappropriate so that the control is prohibited. Also, in a case where the vehicle is not in any of the above states, the control is permitted. In a case where it is determined in the determination 110 that the control is prohibited, processing 165 and processing 175 are executed to release the AccelReq_Eg and the AccelReq_Brk so that the control is not performed.

In a case where it is determined that the control is permitted, processing 120 to processing 170 are performed.

In the processing 120, the target inter-vehicle distance l_tgt is calculated. l_tgt is calculated by Equation 2 below.

$$l\_tgt = Th \times Vp + Loffset \qquad \text{(Equation 2)}$$

At this time, a numerical value of 1 to 3 [s] is set to Th, and a numerical value of 3 to 5 [m] is set to Loffset. Further, by providing a function of changing Th and Loffset according to the preference of the driver and the operation condition of the steering switch, it becomes possible to travel at the inter-vehicle distance matching the preference of the driver. Vp used for calculation can be obtained by (Vh+Vdiff).

Next, in the processing 130, the target acceleration with respect to the preceding vehicle TgtA_Pv is calculated. The processing of calculating the acceleration with respect to the preceding vehicle will be described using the flowchart of FIG. 6.

Figure 6:
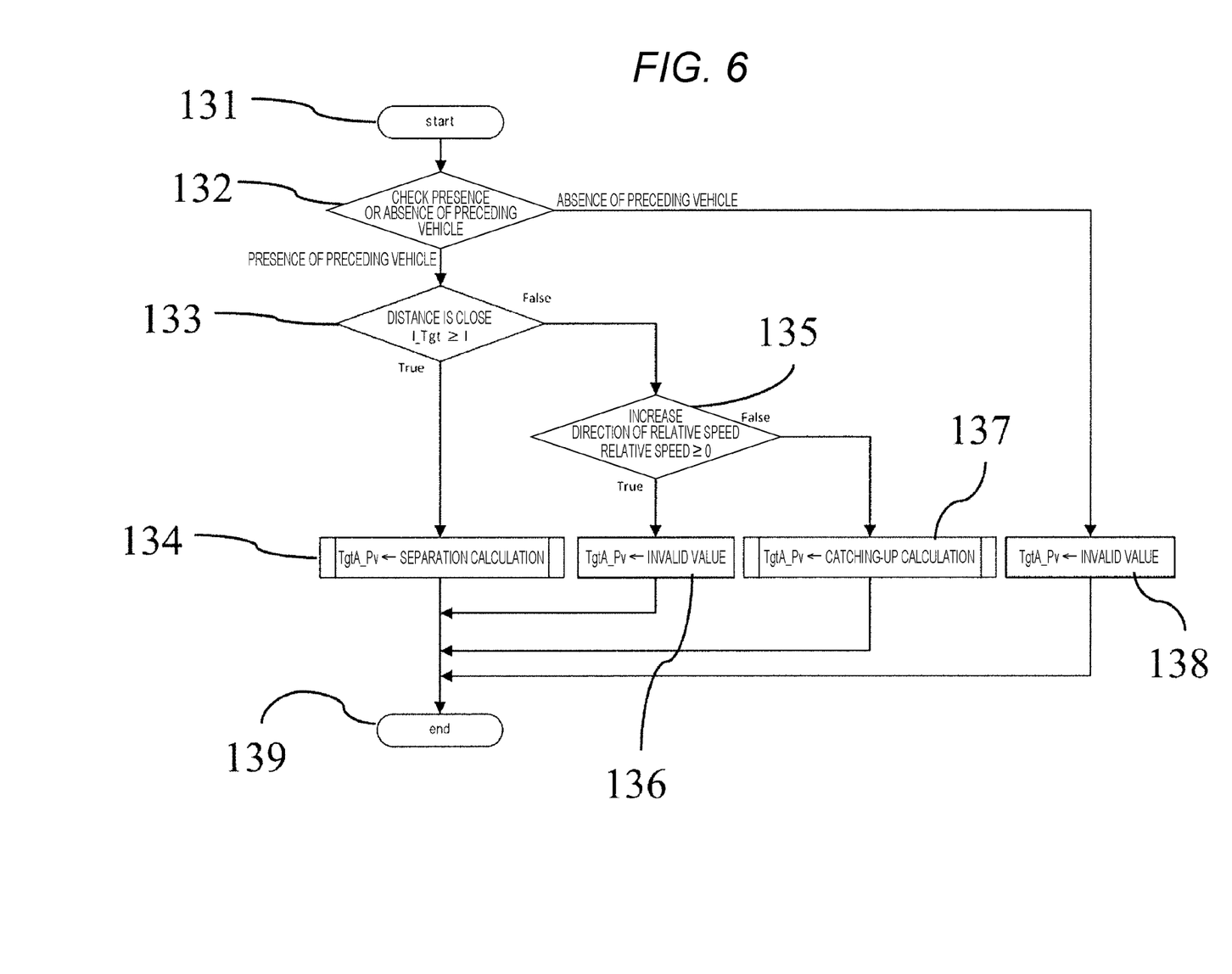
FIG. 6 is a flowchart of processing of calculating acceleration with respect to a preceding vehicle.

The calculation method of TgtA_Pv is switched according to the position or speed relationship with respect to the preceding vehicle.

First, whether there is a preceding vehicle to be controlled is checked in decision 132, and in a case where the preceding vehicle is not present, TgtA_Pv becomes an invalid value in processing 138. In a case where the preceding vehicle is present, decision 133 is performed to determine whether the preceding vehicle is closer than the target inter-vehicle distance, and in a case where the preceding vehicle is closer than the target inter-vehicle distance, target acceleration for separation is calculated in processing 134 to be set to TgtA_Pv. Further, as a result of the decision 133, in a case where the preceding vehicle is farther than the target inter-vehicle distance, decision 135 is performed to determine whether the relative speed is increased, that is, the preceding vehicle is faster. In a case where the preceding vehicle is faster than the host vehicle, TgtA_Pv becomes an invalid value in processing 136.

As a result of the decision 135, in a case where the preceding vehicle is slower than the host vehicle, the target acceleration for catching up is calculated by processing 137 to be set to TgtA_Pv.

The calculation of the target acceleration for separation performed in the processing 134 will be described below. The target acceleration for separation TgtA_Pv_Leave is calculated based on a map value set in advance based on Vdiff and the difference between l_tgt and l. The map value is set such that the speed can be controlled by continuously changing the acceleration control so that the relative speed with the preceding vehicle becomes zero by lowering the speed while approaching the preceding vehicle, lowering the speed while being separated from the preceding vehicle, and performing acceleration while being separated from the preceding vehicle. Depending on the relative speed with the preceding vehicle, control is performed so that only acceleration is performed while being separated from the preceding vehicle in some cases, by skipping a situation of lowering the speed while approaching the preceding vehicle and a situation of lowering the speed while being separated from the preceding vehicle.

The calculation of the target acceleration for catching up performed in the processing 137 will be described below. The target acceleration for catching up TgtA_Pv_Approach is performed by Equation 3 below.

$$TgtA\_Pv\_Approach = -Vdiff^2 \div \{2 \times (l\_tgt - l)\} \quad \text{(Equation 3)}$$

Furthermore, calculation of the target acceleration for catching up is performed by making TgtA_Pv become an invalid value if l is not shorter than a deceleration start threshold l_Thr, and by setting TgtA_Pv_Approach to TgtA_Pv if l is greater than the deceleration start threshold l_Thr such that deceleration starts from a long distance, the preceding vehicle accelerates during that time so that the energy for deceleration is wasted, and the ride comfort does not deteriorate. In a case where the threshold l_Thr is usually set to a value of around 70 m to 130 m with the behavior when the driver drives without using ACC as a guide, control with less discomfort is performed. Further, it is also considered that this threshold is variable depending on the host vehicle speed or the like.

In processing 140, the target acceleration with respect to the set vehicle speed TgtA_Spd is calculated. TgtA_Spd is calculated by Equation 4 below.

$$TgtA\_Spd = K \times (Vtgt - Vh) \quad \text{(Equation 4)}$$

K in Equation 4 above is a positive constant, and is set to 0.001 to 0.02. In addition, in a case where K is set to a variable value such that K is large when accelerating, and is small when decelerating, it is easy to achieve fuel-efficient driving in which the brake is not used for deceleration. Further, when Vh is large, the safety can be enhanced by adjusting K as a variable value so as to weaken the acceleration and strengthen the deceleration. As described above, it is desirable to adjust K as a variable value in accordance with the stability of the vehicle and the preference of the driver who purchases the mounted vehicle.

In processing 150, the target acceleration TgtA is determined. The target acceleration TgtA is obtained in a manner that TgtA_Pv calculated in the processing 130 and TgtA_Spd calculated in the processing 140 are compared with each other and the smaller one, that is, the more decelerating one is selected to be set as TgtA. In addition, since the behavior of the vehicle becomes unstable if the value of TgtA is suddenly changed, it is desirable to smooth the change of the value of TgtA by using a change amount limit or a primary delay filter. Furthermore, the acceleration request to the engine AccelReq_Eg is calculated in processing 160 in which it is desirable that the change amount limit on the acceleration side prioritizes good ride comfort to strengthen suppression, and that the change amount limit on the deceleration side prioritizes safety and makes the change amount limit asymmetric according to the positive and negative directions so that the acceleration becomes difficult and the deceleration becomes easy.

The acceleration request to the engine AccelReq_Eg is calculated based on TgtA calculated in the processing 150. The contents of the processing 160 will be described with reference to FIG. 7.

Figure 7:
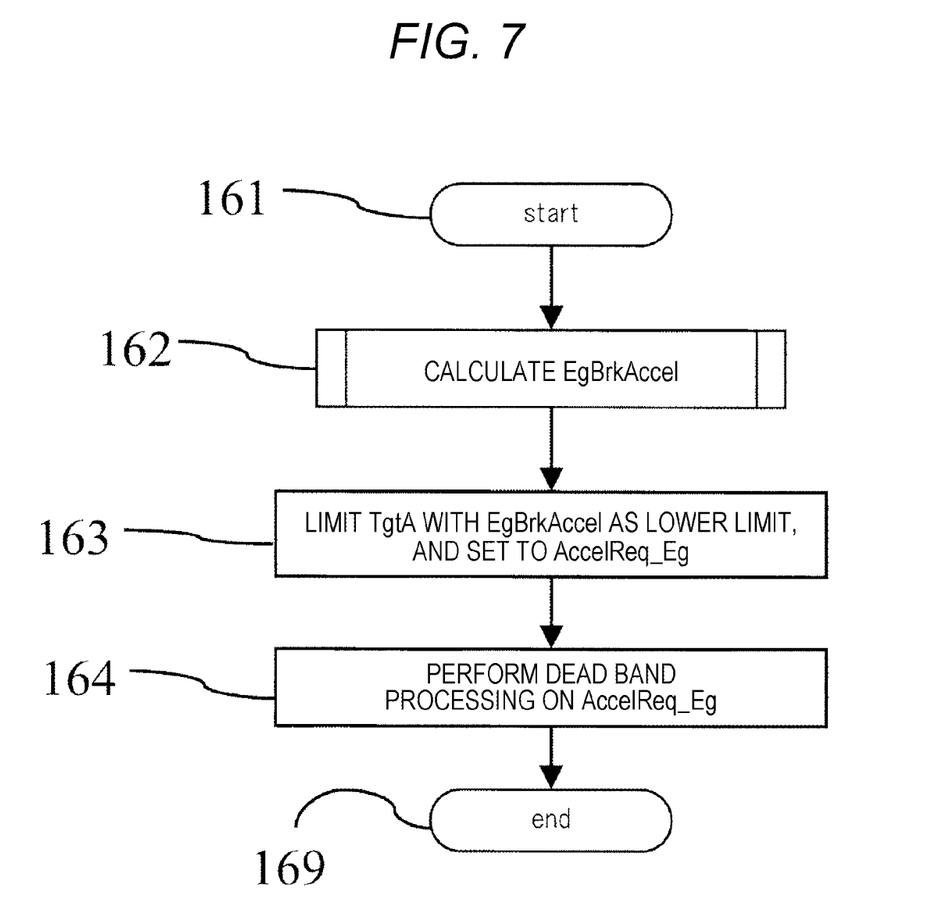
FIG. 7 is a flowchart of processing of calculating an acceleration request to an engine.

First, in processing 162, the acceleration generated by the engine brake EgBrkAccel is calculated. EgBrkAccel is calculated by adding the deceleration by the engine and the deceleration by traveling resistance. The deceleration by the engine is set to a value set according to engine and transmission specifications and a gear ratio according to Vh. In addition, the traveling resistance is calculated using Vp using a coefficient of air resistance according to the shape of the vehicle. Further, the gradient of the road surface is calculated from the comparison between the value of the longitudinal acceleration sensor mounted on the vehicle and the differential value of the wheel speed, and is added to the traveling resistance as gradient resistance. Next, in processing 163, TgtA is limited with EgBrkAccel calculated in the processing 162 as the lower limit to be limited to acceleration that can be operated by the output control of the engine, and is set to AccelReq_Eg. Then, dead band processing is performed on AccelReq_Eg in processing 164, and thereby the discomfort given to the driver, which is caused by the vibration generated in the vehicle body due to the minute change in the output of the engine, is eliminated.

In processing 170, an acceleration request to the brake AccelReq_Brk is calculated.

The acceleration request to the brake AccelReq_Brk is calculated based on TgtA calculated in the processing 150 and AccelReq_Eg calculated in the processing 160. The contents of the processing 170 will be described with reference to FIG. 8.

Figure 8:
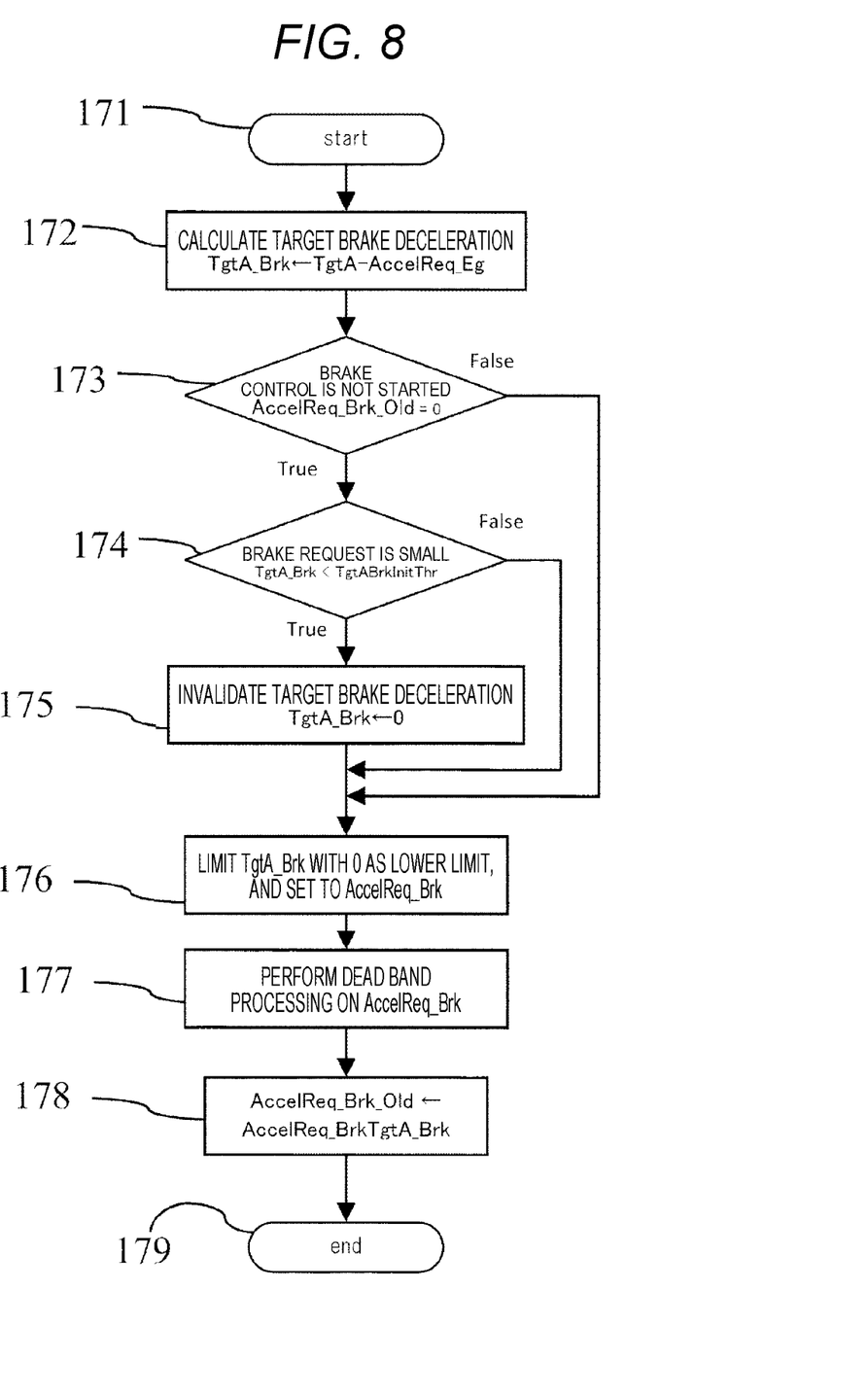
FIG. 8 is a flowchart of processing of calculating an acceleration request to a brake.

First, in processing 172, target deceleration required in the brake TgtA_Brk is calculated by subtracting AccelReq_Eg from TgtA. Next, whether the brake request when the brake control is not started is a weak brake that is smaller than the value of TgtABrkInitThr is determined in determination 173 and determination 174, and in a case where both the conditions of the determination 173 and the determination 174 are satisfied, TgtA_Brk calculated in the processing 172 becomes zero to be invalidated by processing 175. A series of processing from the determination 173 to the processing 175 is provided so that the operation state is continued without repetition of the operation and the release of the brake, and a phenomenon that the vehicle rattles does not occur, which improves the ride comfort. At this time, TgtA-BrkInitThr is set as a constant value, and if TgtABrkInitThr is too large, the deceleration start is delayed to cause sudden braking. On the other hand, if TgtABrkInitThr is too small, the rattling of the vehicle cannot be suppressed. Therefore, it is desirable to set TgtABrkInitThr to about 0.1 $[m/s^2]$ according to the brake performance and stability of the vehicle.

Next, in processing 176, TgtA_Brk is subjected to the limit processing with zero as a lower limit to be set as AccelReq_Brk so that an acceleration request is not erroneously issued to the brake. Next, the dead band processing is performed on AccelReq_Brk in processing 177, and thereby the discomfort given to the driver, which is caused by the vibration generated in the vehicle body due to the minute change in the output of the brake, is eliminated, which becomes the final acceleration request to the brake AccelReq_Brk. In processing 178, in order to determine the start of the brake control in the determination 173, AccelReq_Brk is held in the RAM or the like.

Figure 5:
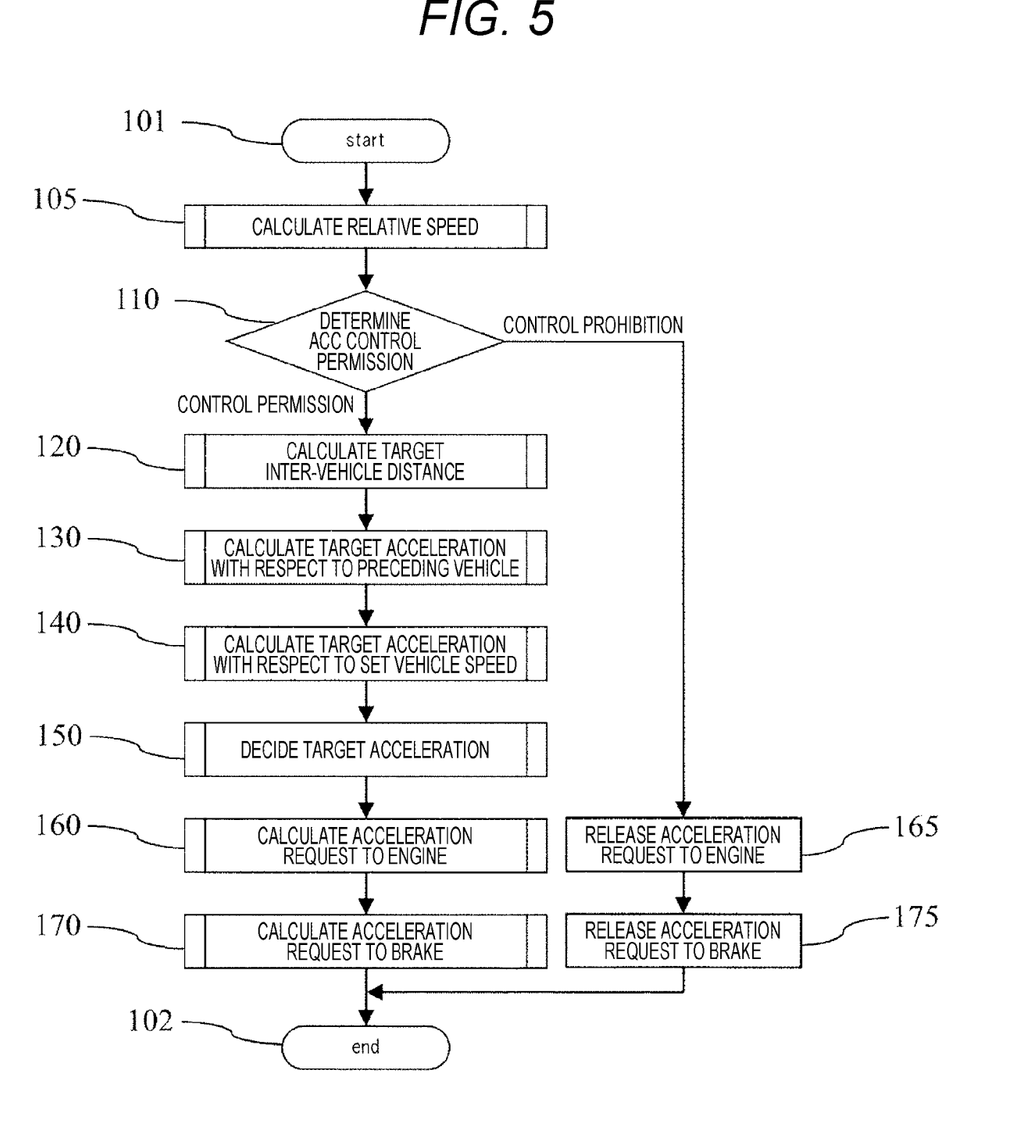
FIG. 5 is a flowchart of calculating target acceleration of ACC.

In the vehicle control device 100, in addition to the control of the acceleration illustrated in FIG. 5, in controlling ACC, processing of generating display information for presenting information to the driver, and communication processing of receiving the target information from the vehicle CAN bus and transmitting ACC control information are performed.

In the processing of generating the display information, a display indicating whether control is in progress is determined in accordance with switch information obtained from the ACC control switch 700 and the condition of the determination 110. Further, control information such as whether the preceding vehicle to be controlled can be detected by the stereo camera and a set vehicle speed used in the processing 140 is set as the display information.

In the communication processing, AccelReq_Brk and AccelReq_Eg which are calculated as acceleration control are respectively transmitted to the brake control unit 400 and the engine control unit 500, and the display information generated in the processing of generating display information is transmitted to the meter control unit 600.

The ACC control switch 700 is installed at a position where the driver can easily operate during driving, such as a switch installed on the steering wheel of a vehicle and a lever attached to the steering column, and is used to perform the ACC control start of the driver, the ACC control release, and the set speed change during ACC traveling. The switch includes a switch for starting ACC, a switch for releasing ACC, a switch for changing the set speed during ACC traveling in a positive direction, a switch for changing the set speed during ACC traveling in a negative direction, a switch for enabling ACC as necessary, and an inter-vehicle distance switch at the time of following travel. Furthermore, a configuration can be adopted in which an increase in cost due to an increase in the type of switch is prevented, such as replacing the switch for starting the ACC with the switch for changing the set speed at the time of ACC traveling in the positive direction during execution of the ACC control.

The brake control unit 400 controls the brake 410 using AccelReq_Brk transmitted from the vehicle control device 100, and controls the acceleration of the vehicle by generating a braking force on the tire 900. At this time, the brake control unit 400 has a function of adjusting the brake output to be generated for AccelReq_Brk based on the weight of the host vehicle, the tire radius, the effective diameter of the brake, and the like.

The engine control unit 500 controls the engine 510 using AccelReq_Eg transmitted from the vehicle control device 100, and controls the acceleration of the vehicle by generating a driving force on the tire 900 through the torque converter 520, the transmission 530, and the final gear 540. At this time, the engine control unit 500 has a function of adjusting the engine torque generated for AccelReq_Eg in consideration of the weight of the host vehicle, the tire radius, and the states of the torque converter 520 and the transmission 530, and controls the engine throttle opening and the injection amount of the engine 510. Furthermore, the target acceleration can be obtained by controlling the transmission gear ratio of the transmission 530 as necessary.

The meter control unit 600 controls the display device 610 and the buzzer 620 according to the display information communicated from the vehicle control device 100, and notifies the driver of an alarm and a control state.

Figure 9:
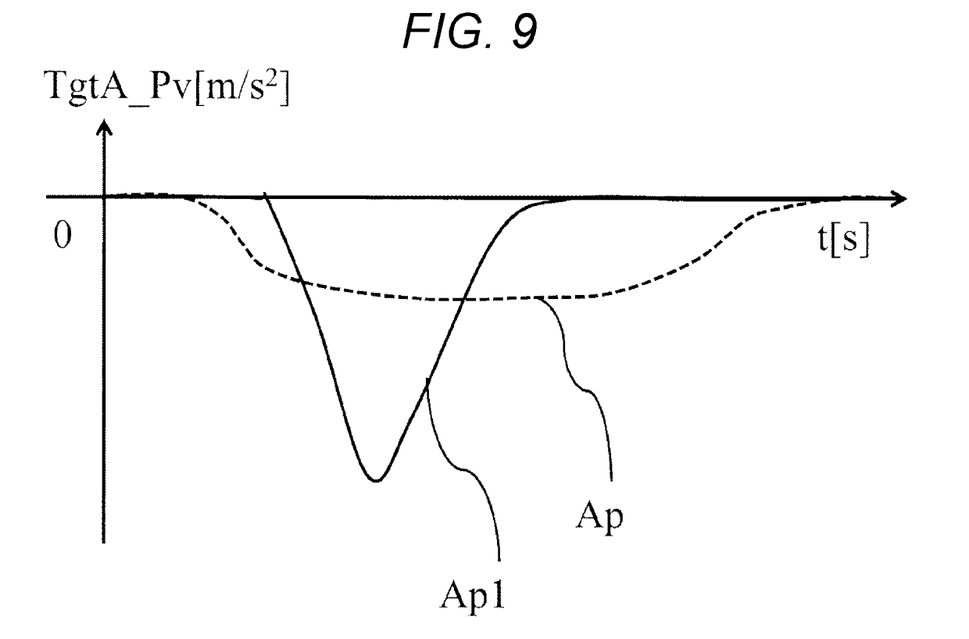
FIG. 9 is a waveform of target acceleration at the time of catching up with a preceding vehicle.

In the configuration described above, in a case where the camera is deformed due to a sudden change in temperature, when 1 and Vdiff cannot be acquired correctly, the behavior of TgtA_Pv at the time of catching up with the preceding vehicle slower than the host vehicle is illustrated in FIG. 9. The waveform Ap in FIG. 9 indicates TgtA_Pv in a case where no parallax error occurs due to the deformation of the stereo camera, and the deceleration is gently generated and the deceleration is gently released so that the relative speed becomes zero at the target inter-vehicle distance. However, if the detected 1 becomes a value larger than the original value due to the parallax error, the timing at which 1 becomes shorter than 1 Thr is delayed, and as a result, the deceleration start is delayed. Therefore, the amount of deceleration is increased by the delay of the start timing of the deceleration control, and TgtA_Pv becomes like a waveform Ap. As a result, the maximum deceleration of Ap1 is larger than that of Ap, and the ride comfort deteriorates.

For this problem, in a case where correction when the temperature difference decided by the stereo camera 200 is large is performed, and in a case where the correction condition of θ is not satisfied for a long time and the correction of the change θ is not correct, TgtA_Pv_Approach is set to TgtA_Pv without performing the condition for invalidating TgtA_Pv when 1 is shorter than 1 Thr. The behavior of TgtA_Pv in this case is illustrated in FIG. 10.

Figure 10:
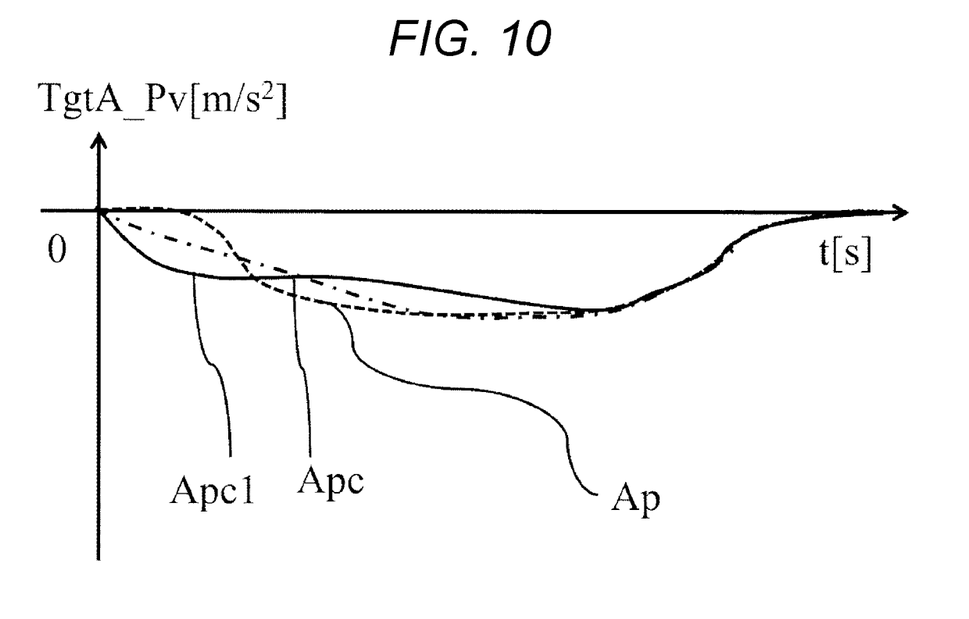
FIG. 10 is a waveform of target acceleration at the time of catching up with a preceding vehicle (when conditions are invalidated).

The waveform Ap illustrated in FIG. 10 is the same as the waveform Ap illustrated in FIG. 9. In addition, a waveform Apc indicates a waveform when the condition with 1_Thr is not performed in the absence of the parallax error, and a waveform Apc1 indicates a waveform when the condition with 1_Thr is not performed in the presence of the parallax error. As illustrated in FIG. 10, Apc starts control at slower deceleration and earlier timing than Ap. Then, Apc1 generates strong deceleration simultaneously with the control start relative to Apc, but since the maximum deceleration is suppressed, it is possible to suppress the deterioration of the ride comfort. On the other hand, since the deceleration start timings of Apc and Apc1 are earlier than that of Ap, and the deceleration is performed in response to a scene where originally the deceleration is not necessary, such as a scene where the preceding vehicle performs temporarily deceleration and acceleration, unnecessary deceleration is increased to cause deterioration of the fuel consumption and the discomfort to the driver. However, it is possible to localize a situation where deterioration of the fuel consumption and the discomfort to the driver occur by limiting to a case where correction when the temperature difference is large is performed with a condition of ignoring the condition of l_Thr, and a case where the correction condition of θ is not satisfied for a long time and the correction of the change θ is not correct.

Next, a modification of the vehicle control device according to the embodiment of the present invention described above will be described.

A vehicle configuration is described as Modification 1. Although a vehicle using an engine is described in the vehicle configuration illustrated in FIG. 1, since this modification is intended for a vehicle acceleration control method, this modification is effective for vehicles using any prime mover, such as electric vehicles, hybrid vehicles, and hydrogen vehicles. For example, in the case of an electric vehicle, the engine can be replaced by a motor. In the case of an electric vehicle, unlike the engine car, since the engine brake is eliminated and the viewpoint of a regenerative brake and battery management is in consideration, it is possible to use the present invention easily by changing EgBrkAccel calculated in the processing 162.

Further, the functions of the vehicle control device illustrated in the present embodiment are realized as software functions. Therefore, a case where the vehicle control device is not prepared as a dedicated control unit but is incorporated as a software function in a stereo camera to be used as a vehicle control device, and a case where the vehicle control device is incorporated as a software function in the brake control unit to be used as a vehicle control device are considered, it is effective for reducing the number of parts and simplifying the architecture, and reducing costs.

A calculation method of target acceleration is described as Modification 2.

In the above-described embodiment, it is assumed that the condition of l_Thr for controlling the start timing of deceleration is invalidated when traveling is performed for catching up with the preceding vehicle. However, the value of l_Thr as a threshold is set to a value larger than an original value without invalidating l_Thr, for example, an offset to the threshold such that 150 m is set instead of 100 m, and thereby it is possible to suppress occurrence of sudden deceleration. This offset amount is set by the parallax error amount obtained from the base length of the stereo camera, the durability to thermal deformation, and the like, and the allowable maximum deceleration (lower limit of acceleration). Furthermore, it is possible to localize a situation where deterioration of the fuel consumption and the discomfort to the driver occur by making it variable according to the host vehicle speed.

In addition, combinations are considered in which according to characteristics of the parallax error amount and the maximum deceleration, condition switching of l_Thr is limited only in a case where correction when the temperature difference is large is performed, and the condition is not invalidated and switching is performed depending on the offset amount in a case where correction of the change θ is not performed for a long time.

According to the embodiment and the modification described above, a vehicle control device performs acceleration/deceleration control of a vehicle according to a relative speed and an inter-vehicle distance with respect to a preceding vehicle obtained from a parallax image, the acceleration/deceleration control of the vehicle is performed with the inter-vehicle distance being less than a certain value, the vehicle control device includes correction means for, in a case where the parallax image is not acquired in a correct state due to distortion due to a temperature change or an incorrect mounting position, correcting the distortion or the incorrect mounting position by the acquired parallax image, and a start timing of the acceleration/deceleration control of the vehicle is changed during a correction operation by the correction means.

Further, a deceleration start timing of the acceleration/deceleration control is advanced during the correction operation of the correction means.

Further, the external recognition means obtains the parallax image by processing images obtained from a plurality of imaging units.

Further, the correction means corrects a measurement error in the inter-vehicle distance due to a change in direction or distortion due to a temperature change of the plurality of imaging units.

Further, communication of the fact that the correction means is performing a correction operation is performed in a car area network.

Further, the acceleration/deceleration control is switched by performing communication of the fact that a condition for permitting correction by the correction means is not established for a predetermined time and the correction is not completed in a car area network.

As described above, by changing the timing at which the acceleration/deceleration control is started, it is possible to suppress the occurrence of sudden deceleration and reduce the discomfort given to the driver.

In addition, it is possible to suppress deterioration of the fuel consumption and deterioration of the ride comfort by limiting the conditions for changing the timing to a case where correction of a measurement error in an inter-vehicle distance caused by distortion of the camera direction due to a temperature change or the like is being performed.

REFERENCE SIGNS LIST

100 vehicle control device
200 stereo camera
230 image processing (correction means)

The invention claimed is:

1. A vehicle control device configured to control acceleration/deceleration of a vehicle according to a relative speed and an inter-vehicle distance with respect to a preceding vehicle obtained from a parallax image, wherein the vehicle control device is configured to control acceleration/deceleration of the vehicle with the inter-vehicle distance being less than a certain value, wherein the vehicle control device includes a processor configured to:

in a case where the parallax image is not acquired in a correct state due to distortion due to a temperature change or an incorrect mounting position, perform a correction operation to correct the distortion or the incorrect mounting position by the acquired parallax image, and change a start timing of the acceleration/deceleration of the vehicle during the correction operation, and advance a deceleration start timing of the acceleration/deceleration for the vehicle during the correction operation.

2. The vehicle control device according to claim 1, wherein the processor is configured to correct a measurement error in the inter-vehicle distance due to a change in direction or distortion due to a temperature change of a plurality of imaging units.

3. The vehicle control device according to claim 1, wherein the acceleration/deceleration of the vehicle is switched by performing communication of the fact that a condition for permitting the correction operation by the processor is not established for a predetermined time and the correction operation is not completed in a car area network.

4. A vehicle control device configured to control acceleration/deceleration of a vehicle according to a relative speed and an inter-vehicle distance with respect to a preceding vehicle obtained from a parallax image, wherein the vehicle control device is configured to control acceleration/deceleration of the vehicle with the inter-vehicle distance being less than a certain value, wherein the vehicle control device includes a processor, the processor configured to:

in a case where the parallax image is not acquired in a correct state due to distortion due to a temperature change or an incorrect mounting position, perform a correction operation to correct the distortion or the incorrect mounting position by the acquired parallax image, and change a start timing of the acceleration/deceleration of the vehicle during the correction operation by the processor, wherein the processor is configured to obtain the parallax image by processing images obtained from a plurality of imaging units.

5. A vehicle control device configured to control acceleration/deceleration of a vehicle according to a relative speed and an inter-vehicle distance with respect to a preceding vehicle obtained from a parallax image, wherein the vehicle control device is configured to control acceleration/deceleration of the vehicle with the inter-vehicle distance being less than a certain value, wherein the vehicle control device includes a processor, the processor configured to:

in a case where the parallax image is not acquired in a correct state due to distortion due to a temperature change or an incorrect mounting position, perform a correction operation to correct the distortion or the incorrect mounting position by the acquired parallax image, and change a start timing of the acceleration/deceleration of the vehicle during the correction operation by the processor, wherein communication of a fact that the processor is performing the correction operation is performed in a car area network.

* * * * *